(12) United States Patent
Nakae et al.

(10) Patent No.: US 12,041,937 B2
(45) Date of Patent: Jul. 23, 2024

(54) COPPER CHELATE COMPLEX COMPOSITIONS FOR ANTIFOULING PROTECTION

(71) Applicant: ARXADA AG, Visp (CH)

(72) Inventors: Takashi Nakae, Matsudo (JP); Paul Kappock, Cumming, GA (US); Yoshiyuki Iwase, Nasushiobara (JP); Josef Schroeer, Muttenz (CH); Juergen Riegler, Visp (CH); Peter Van Aken, Betekom (BE)

(73) Assignee: ARXADA AG, Visp (CH)

( * ) Notice: Subject to any disclaimer, the term of this patent is extended or adjusted under 35 U.S.C. 154(b) by 530 days.

(21) Appl. No.: 17/299,924

(22) PCT Filed: Dec. 6, 2019

(86) PCT No.: PCT/EP2019/084097
§ 371 (c)(1),
(2) Date: Jun. 4, 2021

(87) PCT Pub. No.: WO2020/115323
PCT Pub. Date: Jun. 11, 2020

(65) Prior Publication Data
US 2022/0095625 A1    Mar. 31, 2022

Related U.S. Application Data

(60) Provisional application No. 62/775,991, filed on Dec. 6, 2018.

(30) Foreign Application Priority Data

Dec. 6, 2018  (EP) .................................... 18210812

(51) Int. Cl.
*A01N 59/20* (2006.01)
*A01N 55/02* (2006.01)
*A01P 9/00* (2006.01)
*A01P 13/00* (2006.01)
*C09D 5/16* (2006.01)

(52) U.S. Cl.
CPC ............. *A01N 59/20* (2013.01); *A01N 55/02* (2013.01); *A01P 9/00* (2021.08); *A01P 13/00* (2021.08); *C09D 5/1618* (2013.01); *A01N 2300/00* (2013.01)

(58) Field of Classification Search
CPC ........ A01N 59/20; A01N 55/02; A01N 25/04; A01N 37/42; A01N 43/36; A01N 43/40; A01N 43/80; A01N 59/16; A01N 2300/00; A01P 9/00; A01P 13/00; C08F 220/14; C08F 220/1802; C08F 230/085; C09D 5/00; C09D 5/1618; C09D 5/1612; C09D 5/1625; C09D 5/165; C09D 5/1668; C09D 133/08; C09D 143/04; C09D 193/04
See application file for complete search history.

(56) References Cited

U.S. PATENT DOCUMENTS

2002/0033114 A1    3/2002  Suehiro et al.

FOREIGN PATENT DOCUMENTS

| CL | 52912 | 1/2008 |
|---|---|---|
| CL | 54370 | 2/2015 |
| CL | 55099 | 2/2015 |
| CL | 59726 | 2/2015 |
| GB | 2559454 | 8/2018 |
| JP | H04331207 | 11/1992 |
| JP | 2000248207 | 9/2000 |
| JP | 2014224066 | 12/2014 |
| JP | 2018109146 | 7/2018 |
| WO | WO2018158436 | 9/2018 |

OTHER PUBLICATIONS

International Search Report for PCT/EP2019/084097 dated Jan. 27, 2020, 12 pages.

*Primary Examiner* — Anthony J Green
(74) *Attorney, Agent, or Firm* — Dority & Manning, P.A.

(57) ABSTRACT

The present invention relates to antifouling compositions comprising copper di(ethyl 4,4,4-trifluoroacetoacetate) (Cu (ETFAA)2) that are highly effective against marine biofouling of surfaces of ships and marine structures, their use for inhibiting marine biofouling, as well as antifouling paints comprising said compositions.

16 Claims, 1 Drawing Sheet

Appearance of panels after 24 months in sea-water

Front unrinsed

Experimental   Control

Back Unrinsed

Experimental   Control

Front after rinsing

Experimental   Control

Back after rinsing

Experimental   Control

COPPER CHELATE COMPLEX COMPOSITIONS FOR ANTIFOULING PROTECTION

FIELD OF THE INVENTION

The present invention relates to antifouling compositions comprising copper di(ethyl 4,4,4-trifluoroacetoacetate) (Cu(ETFAA)$_2$) that are highly effective against marine biofouling of surfaces of ships and marine structures, their use for inhibiting marine biofouling, as well as antifouling paints comprising said compositions.

BACKGROUND OF THE INVENTION

Ships, aquaculture fishnets, underwater structures and equipment tend to be attacked by marine organisms such as barnacles, bryozoans, hydroids, mussels, algae, and the like. Organisms can grow and multiply and eventually cause significant problems. For example, in the case of a ship's hull, the growth of marine organisms on the hull can increase the frictional resistance between the hull and water, thus increasing fuel consumption and reducing the speed of the ship. Ship hulls need to be protected against the growth of marine organisms in order to keep them clean and smooth for maximum fuel efficiency. There is also a concern for transporting marine organisms from one part of the world to another, with the possibility of the foreign organisms disrupting the indigenous ecology. Thus, adequate protection against marine biofouling is required for underwater parts, which is typically achieved with antifouling paints.

The binder systems used for such antifouling paints are typically composed of an erodible binder. The erosion of the paint film aids in preventing fouling by releasing antifouling agents (biocidal agents) from the coating over time thus impeding the attachment of fouling organisms. There are two main types of eroding antifouling coatings, described by the industry as "self-polishing" and as "ablative".

The binder system of ablative coatings is composed of mostly rosin which will react with sea water to become water soluble and erodes away. Alternatively, rosin or rosin derivatives are also used in mixtures with non-erodible binders such as polyester resin, acrylic resin, epoxy resin, vinyl chloride resin, chlorinated rubber resin, chlorinated polyethylene resin, chlorinated polypropylene resin, styrene-butadiene resin, or polyamide resin.

In "self-polishing antifouling coatings", the binder system is based on hydrolysable acrylate polymers. The hydrolysable functionality is commonly provided to the polymer by either a metal carboxylate acrylate monomer or a silyl acrylate monomer. Erodible polyester binders are also used and result in lower cost antifouling paints. The difference between ablative and self-polishing coatings lies mainly in the thickness of the leached layer and the more linear rate of erosion over time for the self-polishing coating.

"Hybrid coatings" also exist whose binder systems are composed of an erodible acrylate such as in self-polishing paints, and rosin. The thickness of the leached layer is thinner than in ablative coatings, but thicker than in true self-polishing coatings.

Most commercially available antifouling paints contain a high metal content due to the high concentration of cuprous oxide (Cu$_2$O) used as the biocidal agent therein, i.e., typically about 40 wt %, which is required for appropriate antifouling protection. Cuprous oxide is potentially harmful to many organisms. The leaching from antifouling paints can contribute to elevated copper levels in the water, sediments and surrounding environments. Artificial high copper levels may have a significant ecological impact. Whilst Cu$_2$O is very widely used as antifouling agent in antifouling paints, antifouling paints can also contain additional biocidal agents since Cu$_2$O alone is only effective against the hard fouling organisms like barnacles.

As an additional disadvantage, cuprous oxide typically imparts a strong red-brown color to the antifouling paint film, and may also react with atmospheric carbon dioxide and chlorides from sea-water to form non-uniform streaking on the surface of the coating. This is an unattractive appearance and may occur, e.g., shortly after the ship is launched into the sea. Some yacht owners and cruise ship operators prefer bright colors and uniform appearance that cannot be attained in paints that contain cuprous oxide.

Attempts to replace cuprous oxide in commercially available antifouling paints led to the development of alternatives to cuprous oxide such as copper thiocyanate, which is white in color, and tralopyril, an agricultural pesticide that has efficacy against barnacles. But the costs are higher for these alternatives and they are not as effective as cuprous oxide based antifouling paints.

Therefore, there is a need for ecologically and economically improved marine antifouling paints with reduced copper content, or that even fully replace the cuprous oxide in conventionally used antifouling paints.

The antifouling compositions of the present invention comprising Cu(ETFAA)$_2$ fulfill this need. The inventors have surprisingly found that Cu(ETFAA)$_2$ is a highly effective and versatile agent that enhances the antifouling performance of all types of antifouling paints such as ablative paints or self-polishing paints, and may also be used in simple contact leaching coatings.

Thus, it is now possible to partly or fully replace Cu$_2$O in antifouling paints and hence to drastically reduce the metal content therein while remaining appropriate antifouling performance. Moreover, the antifouling compositions of the invention comprising Cu(ETFAA)$_2$ are essentially colorless and hence do not interfere with the bright colors oftentimes desired for ship hulls.

DETAILED DESCRIPTION OF THE INVENTION

Unless defined otherwise, all technical and scientific terms used herein have the same meaning as commonly understood by one of ordinary skill in the art to which this invention is related. The following abbreviations and terms are used herein:

AIBN: azobis(isobutyronitril)
AMBN: azobis-(2-methylbutyronitrile)
A630-20x: a fatty acid amide
BA: butyl acrylate
Chlorothalonil: 2,4,5,6-tetrachlorobenzene-1,3-dicarbonitrile
Copper Omadine®, CuPT, copper pyrithione: copper 2-pyridinethiol-1-oxide
Cu$_2$O: cuprous oxide
Cu(ETFAA)$_2$: copper di(ethyl 4,4,4-trifluoroacetoacetate)
CuSCN: copper(I) thiocyanate DCOIT: 4,5-dichloro-2-n-octyl-4-isothiazolin-3-one
Diuron: 3-(3,4-dichlorophenyl)-1,1-dimethylurea
ETFAA: ethyl 4,4,4-trifluoroacetoacetate
2MEA: 2-methoxyethyl acrylate monomer
Medetomidine: 4-[1-(2,3-dimethylphenyl)ethyl]-1H-imidazole
MMA: methyl methacrylate monomer
MIBK: methyl isobutylketone
MPM: methoxy propylene monomer
PGM: propylene glycol monomethylether
TIPX: tri-isopropylsilyl acrylate monomer
Tralopyril: 4-bromo-2-(4-chlorophenyl)-5-(trifluoromethyl)-1H-pyrrole-3-carbonitrile
VAGH: vinyl chloride/vinyl acetate/vinyl alcohol copolymer (commercial product)
Zineb: zinc ethane-1,2-diylbis(dithiocarbamate)
Ziram: zinc N,N-dimethylcarbamodithioate
ZnO: zinc oxide
ZnPT, zinc pyrithione: zinc 2-pyridinethiol-1-oxide The term "(meth)acrylate" is a collective term indicating both acrylate and methacrylate monomers. The term "methacrylate" or "meth-acrylate" indicates only methacrylate monomers.

Bentone SD2 is an organo clay added for anti-settling properties; Bentone #38 is quaternium 18-hectorite clay; Minex 4 is nepheline syenite clay. Disparlon 6900-20× (A630-20× polyamide wax) is a 20% dispersion of polyamide wax in xylene used as rheology modifier; Disperbyk 161 is a dispersing additive. Resin refers to all pre-polymers or polymers that may serve as raw materials for the binders to be used in the antifouling paints of the invention. Rosin or gum rosin refers to colophony (CAS: 8050-09-7, see also https://www.megaglori.com/what-is-gum-rosin/).

By "biocidal agent" is meant any chemical compound that prevents the settlement of marine organisms on a surface and/or prevents the growth of marine organisms on a surface and/or encourages the dislodgement of marine organisms from a surface.

The terms "antifouling paint", "antifouling coating" and "antifouling formulation" are used interchangeably herein.

The present invention provides a new approach to inhibit the fouling of surfaces of underwater objects such as ship hulls or any other marine structures. Specifically, the present invention provides an antifouling composition comprising Cu(ETFAA)$_2$. It has been surprisingly found that Cu(ETFAA)$_2$ significantly enhances the antifouling efficacy of antifouling compositions against the settling of marine organisms such as barnacles, bryozoans, hydroids, mussels, algae and the like.

ETFAA is a compound that is known as an intermediate in the production of compounds used in agriculture and pharmaceuticals. The copper chelate complex of ETFAA may be formed by adding a 1:2 molar ratio of copper hydroxide (Cu(OH)$_2$) to ETFAA. The complex is formed rapidly at room temperature with high yield:

2ETFAA+Cu(OH)$_2$→Cu(ETFAA)$_2$+2H$_2$O.

The antifouling composition of the invention may further comprise one or more biocidal agents capable of preventing the fouling on the surface of an object.

Such biocidal agents may be inorganic biocidal agents, organometallic biocidal agents or organic biocidal agents.

Examples of inorganic biocidal agents are copper and copper compounds such as copper oxides, e.g. cuprous oxide and cupric oxide; copper alloys, e.g. copper-nickel alloys; copper salts, e.g. copper thiocyanate (CuSCN), copper sulphide; or barium metaborate.

Examples of organometallic biocidal agents are zinc 2-pyridinethiol-1-oxide [ZnPT, zinc pyrithione]; organo-copper compounds such as copper 2-pyridinethiol-1-oxide [CuPT, copper pyrithione], copper acetate, copper naphthenate, copper 8-quinolinonate [oxine-copper], copper nonylphenolsulfonate, copper bis(ethylenediamine)bis (dodecylbenzensulfonate) and copper bis (pentachlorophenolate); dithiocarbamate compounds such as zinc N,N-dimethylcarbamodithioate [ziram], zinc ethane-1,2-diylbis(dithiocarbamate) [zineb], manganese ethylenebis(dithiocarbamate) [maneb] or manganese ethylenebis(dithiocarbamate) complexed with zinc salt [mancozeb].

Examples of organic biocidal agents are heterocyclic compounds such as 2-(tert-butylamino)-4-(cyclopropylamin)-6-(methylthio)-1,3,5-triazine [cybutryne], 4,5-dichloro-2-n-octyl-4-isothiazolin-3-one [DCOIT], 1,2-benzisothiazolin-3-one [BIT], 2-(thiocyanatomethylthio)-1,3-benzothiazole [benthiazole], 3-benzo[b]thien-2-yl-5,6-dihydro-1,4,2-oxathiazine-4-oxide [bethoxazin] and 2,3,5,6-tetrachloro-4-(methylsulphonyl)pyridine; urea derivatives such as 3-(3,4-dichlorophenyl)-1,1-dimethylurea [diuron]; amides and imides of carboxylic acids, sulphonic acids and sulphenic acids such as N-(dichlorofluoromethylthio) phthalimide, N-dichlorofluoromethylthio-N',N'-dimethyl-N-phenylsulfamide [dichlofluanid], N-dichlorofluoromethylthio-N',N'-dimethyl-N-p-tolylsulfamide [tolylfluanid] and N-(2,4,6-trichlorophenyl) maleimide; other organic compounds such as pyridine triphenylborane, amine triphenylborane, 3-iodo-2-propynyl-N-butylcarbamate [iodocarb], 2,4,5,6-tetrachloroisophthalonitrile [chlorothalonil], p-((diiodomethyl)sulphonyl) toluene or 4-bromo-2-(4-chlorophenyl)-5-(trifluoromethyl)-1H-pyrrole-3-carbonitrile [tralopyril].

Other examples of biocidal agents are tetra-alkylphosphonium halogenides, guanidine derivatives, imidazole containing compounds such as 4-[1-(2,3-dimethylphenyl)ethyl]-1H-imidazole [medetomidine] and derivatives, macrocyclic lactones including avermectins and derivatives thereof such as ivermectine, or spinosyns and derivatives thereof such as spinosad, or enzymes such as oxidase, or proteolytically, hemicellulolytically, cellulolytically, lipolytically or amylolytically active enzymes.

In one embodiment, the antifouling composition of the invention comprises Cu(ETFAA)$_2$ and further one or more biocidal agents selected from the group consisting of copper 2-pyridinethiol-1-oxide (CuPT, copper pyrithione), zinc 2-pyridinethiol-1-oxide (ZnPT, zinc pyrithione), 4,5-dichloro-2-n-octyl-4-isothiazolin-3-one (DCOIT), cuprous oxide (Cu$_2$O), zinc oxide (ZnO), 4-bromo-2-(4-chlorophenyl)-5-(trifluoromethyl)-1H-pyrrole-3-carbonitrile (tralopyril), zinc ethane-1,2-diylbis(dithiocarbamate) (zineb), zinc N,N-dimethylcarbamodithioate (ziram), 3-(3,4-dichlorophenyl)-1,1-dimethylurea (diuron), copper(I) thiocyanate (CuSCN), 4-[1-(2,3-dimethylphenyl)ethyl]-1H-imidazole (medetomidine), triazines, fluanids and 2,4,5,6-tetrachloroisophthalonitrile (chlorothalonil).

In a preferred embodiment, the antifouling composition of the invention comprises Cu(ETFAA)$_2$ and one or more biocidal agents selected from the group consisting of CuPT, ZnPT, DCOIT, Cu$_2$O and tralopyril.

In a more preferred embodiment, the antifouling composition of the invention comprises Cu(ETFAA)$_2$ and one or more biocidal agent selected from the group consisting of CuPT and Cu$_2$O. The ratio of Cu(ETFAA)$_2$ (wt %) to CuPT (wt %) and/or the ratio of Cu(ETFAA)$_2$ (wt %) to Cu$_2$O (wt %) is advantageously from 100:1 to 1:100, preferably from 10:1 to 1:10, and most preferably from 5:1 to 1:5.

In a specific embodiment, the antifouling composition of the invention comprises $Cu(ETFAA)_2$ and CuPT. The ratio of $Cu(ETFAA)_2$ (wt %) to CuPT (wt %) is advantageously from 100:1 to 1:100, preferably from 10:1 to 1:10, and most preferably from 5:1 to 1:5.

In another specific embodiment, the antifouling composition of the invention comprises $Cu(ETFAA)_2$ and $Cu_2O$. The ratio of $Cu(ETFAA)_2$ (wt %) to $Cu_2O$ (wt %) is advantageously from 100:1 to 1:100, preferably from 10:1 to 1:10, and most preferably from 5:1 to 1:5.

In a more specific embodiment, the antifouling composition of the invention comprises $Cu(ETFAA)_2$, CuPT and $Cu_2O$, wherein the ratio of $Cu(ETFAA)_2$ (wt %) to CuPT (wt %) is from 5:1 to 2:1, and wherein the ratio of $Cu(ETFAA)_2$ (wt %) to $Cu_2O$ (wt %) is 5:1 to 1:5.

In another specific embodiment, the antifouling composition of the invention comprises $Cu(ETFAA)_2$ and CuPT and is free of $Cu_2O$, wherein the ratio of $Cu(ETFAA)_2$ (wt %) to CuPT (wt %) is from 5:1 to 2:1.

The antifouling compositions of the invention comprising $Cu(ETFAA)_2$ not only provide excellent antifouling properties, but are also essentially colorless and hence do not interfere with the bright colors oftentimes desired for ship hulls.

The present invention further provides the use of the antifouling compositions of the invention for the inhibition of marine biofouling on a solid surface. The solid surface may be any solid surface of underwater objects such as ships, an aquaculture fishnet, an underwater structure and equipment, a tank, an offshore construction, a pipe, a net, a pier, a pile or a pillar or the like.

The antifouling compositions of the invention may further be used in combination with a polymer and/or copolymer allowing the controlled release of $Cu(ETFAA)_2$, and if present also the controlled release of said one or more biocidal agents comprised therein, e.g., by releasing these agents from an antifouling coating overtime as is the case with self-polishing or ablative coatings.

The inventors have surprisingly found that $Cu(ETFAA)_2$ is a versatile agent that may be used in all types of antifouling coatings, i.e., in antifouling coatings based on various different polymers and/or copolymers typically used as binders for antifouling coating compositions. Thus, the polymers and/or copolymers allowing the controlled release of $Cu(ETFAA)_2$, and if present also the controlled release of said one or more biocidal agents comprised therein, may be any polymers and/or copolymers typically used as binder in antifouling coatings. Suitable polymers and/or copolymers for that purpose are known to the person skilled in the art. Depending on the amount and kind of binder used, $Cu(ETFAA)_2$ and the one or more biocidal agents will be released in a controlled manner at a predetermined desired rate, e.g., that is appropriate for the sailing pattern of a ship.

For example, the polymers and/or copolymers that are used as binders in "self-polishing antifouling coatings" allowing the controlled release of $Cu(ETFAA)_2$ and said one or more biocidal agents may be hydrolysable acrylate polymers such as (meth)acrylate based polymers and/or copolymers. The (meth)acrylate monomer moiety in a (meth)acrylate polymer and/or copolymer may be an alkyl (meth)acrylate, for example a methyl (meth)acrylate, ethyl (meth)acrylate, propyl (meth)acrylate, isopropyl (meth)acrylate, butyl (meth)acrylate, isobutyl (meth)acrylate, tert-butyl (meth)acrylate, pentyl (meth)acrylate, hexyl (meth)acrylate, heptyl (meth)acrylate, cyclohexyl (meth)acrylate, octyl (meth)acrylate, iso-octyl (meth)acrylate, 2-ethylhexyl (meth)acrylate, 3,5,5-trimethylhexyl (meth)acrylate, lauryl (meth)acrylate, cetyl (meth)acrylate and stearyl (meth)acrylate; but also phenyl (meth)acrylate; benzyl (meth)acrylate; or an alkoxyalkyl (meth)acrylate such as methoxymethyl (meth)acrylate, 2-methoxyethyl (meth)acrylate, ethoxymethyl (meth)acrylate, 2-ethoxyethyl (meth)acrylate, 4-methoxybutyl (meth)acrylate, methoxypropyl (meth)acrylate, ethoxypropyl (meth)acrylate, propoxyethyl (meth)acrylate, 2-butoxyethyl (meth)acrylate, isobutoxybutyl diglycol (meth)acrylate; but also a phenoxyethyl (meth)acrylate; or a hydroxyalkyl (meth)acrylate such as hydroxymethyl (meth)acrylate, 2-hydroxyethyl (meth)acrylate, 2-hydroxypropyl (meth)acrylate, 4-hydroxybutyl (meth)acrylate or 2-hydroxy-3-phenoxypropyl (meth)acrylate;

the (meth)acrylate monomer moiety in a (meth)acrylate polymer and/or copolymer may further be a silyl (meth)acrylate such as tribenzylsilyl (meth)acrylate, trimethylsilyl (meth)acrylate, triethylsilyl (meth)acrylate, tri-isopropylsilyl (meth)acrylate, tri-n-butylsilyl (meth)acrylate, tri-isobutylsilyl (meth)acrylate, tri-t-butylsilyl (meth)acrylate, tri-n-amylsilyl (meth)acrylate, tri-n-dodecylsilyl (meth)acrylate, tri-n-hexylsilyl (meth)acrylate, tri-n-octylsilyl (meth)acrylate, tri-n-propylsilyl (meth)acrylate or triphenylsilyl (meth)acrylate;

the (meth)acrylate polymers and/or copolymers may also comprise a metal salt moiety of acrylic or methacrylic acid, referred to herein as a "metal salt (meth)acrylate". The metal may be any suitable metal known to the skilled artisan, e.g., zinc, calcium, magnesium, lithium, iron, zirconium, aluminum, cobalt, zirconium, barium and bismuth.

The polymer and/or copolymer allowing the controlled release of $Cu(ETFAA)_2$, and if present also the controlled release of said one or more biocidal agents, may also be a VAGH copolymer. The VAGH copolymer may be dissolved in 2:3 xylene:MIBK.

Thus, in one embodiment, the polymer and/or copolymer allowing the controlled release of $Cu(ETFAA)_2$, and if present also the controlled release of said one or more biocidal agents comprises a (meth)acrylate polymer and/or copolymer, or a VAGH copolymer. The (meth)acrylate polymer and/or copolymer may be a polymer or copolymer of monomer moieties selected from the group consisting of alkyl (meth)acrylate, phenyl (meth)acrylate, benzyl (meth)acrylate, alkoxyalkyl (meth)acrylate, hydroxyalkyl (meth)acrylate, zinc (meth)acrylates, and silyl-(meth)acrylate; or the (meth)acrylate polymer and/or copolymer may be a polymer or copolymer of monomer moieties selected from the group consisting of ethyl acrylate, methyl methacrylate, butyl acrylate, 2-methoxyethyl acrylate, zinc methacrylate, and tri-isopropylsilyl acrylate, preferably, the (meth)acrylate polymer and/or copolymer is a copolymer of monomer moieties selected from the group consisting of ethyl acrylate, methyl methacrylate, and zinc methacrylate, more preferably, the (meth)acrylate polymer polymer and/or copolymer is a copolymer of monomer moieties selected from the group consisting of ethyl acrylate, methyl methacrylate, 2-methoxyethyl acrylate and zinc methacrylate, and most preferably, the (meth)acrylate polymer polymer and/or copolymer is a copolymer of monomer moieties selected from the group consisting of methyl methacrylate, butyl acrylate, 2-methoxyethyl acrylate and tri-isopropylsilyl acrylate.

Consequently, the invention further provides an antifouling paint comprising the antifouling composition of the invention and a polymer and/or copolymer allowing the controlled release of $Cu(ETFAA)_2$, and if present also the controlled release of said one or more biocidal agents.

The content of Cu(ETFAA)$_2$ in the antifouling paint of the invention is from about 1 to about 25 wt %, preferably from about 3 to about 20 wt %, and more preferably from about 4 to about 18 wt %, and most preferably from about 5 to about 15 wt %.

Due to the excellent enhancing properties of Cu(ETFAA)$_2$, only low amounts of said one or more biocidal agents are required in the antifouling paint of the invention. The total content of the one or more biocidal agents in the antifouling paint of the invention is less than about 30 wt %, preferably less than about 25 wt %, more preferably less than about 20 wt %, and most preferably less than about 18 wt %.

The total content of CuPT in the antifouling paint of the invention is less than about 10 wt %, more preferably less than about 8 wt %, and most preferably less than about 7 wt %.

The total content of Cu$_2$O in the antifouling paint of the invention is less than about 20 wt %, more preferably less than about 15 wt %, and most preferably less than about 12 wt %.

Thus, the content of toxic metal compounds, in particular of Cu$_2$O, is kept at a very low level, and can even be avoided.

The present invention further provides a method for inhibiting marine biofouling on a solid surface, characterized in that an antifouling paint comprising the antifouling composition of the invention is applied on said surface. The solid surface may be any solid surface of underwater objects such as ships, an aquaculture fishnet, an underwater structure and equipment, a tank, an offshore construction, a pipe, a net, a pier, a pile or a pillar and the like.

In the following, the present invention will be further described with reference to Examples, but should be construed that the present invention is in no way limited to these Examples.

EXAMPLES

Example 1: Preparation of Exemplary Polymer-Based Binders for Antifouling Paints Different exemplary polymer-based binders that can be used in self-polishing antifouling paints or hybrid coatings have been prepared as outlined in the following.

Example 1A: Synthesis of an Acrylate Polymer "Acid Acrylate Low Acid Value" Referred to Herein as "Ac (AV=100−)"

| Description | Quantity (g) | Weight (%) |
|---|---|---|
| MPM | 355.03 | 11.83 |
| Xylene | 671.01 | 22.37 |
| ethyl acrylate | 56.8 | 1.89 |
| bring to 100° C. while mixing and drop into the following mixture over 6 hours | | |
| methyl methacrylate | 213.02 | 7.1 |
| ethyl acrylate | 1009.47 | 33.65 |
| methacrylic acid | 149.11 | 4.97 |
| Xylene | 147.93 | 4.93 |
| Methyl Styrene Dimer | 14.2 | 0.47 |
| AIBN | 35.5 | 1.18 |
| AMBN | 99.41 | 3.31 |
| add chaser and xylene over 1/2 hour | | |
| t-butylperoxy 2-ethylhexyl carbonate | 7.1 | 0.24 |
| Xylene | 143.2 | 4.77 |
| mix for 90 minutes after chaser is in. Cool down and add | | |
| Xylene | 98.22 | 3.27 |
| Total | 3000 | 100 |
| Manual Yield % | 100 | |
| Net | 3000 | |

Example 1B: Synthesis of an Acrylate Polymer "Acid Acrylate 100 Acid Value" Referred to Herein as "Ac (AV=100)"

| Description | Quantity (g) | Weight (%) |
|---|---|---|
| MPM | 355.5 | 11.85 |
| Xylene | 668.4 | 22.28 |
| ethyl acrylate | 56.7 | 1.89 |
| bring to 100° C. while mixing and drop into the following mixture over 6 hours | | |
| methyl methacrylate | 142.2 | 4.74 |
| ethyl acrylate | 867.3 | 28.91 |
| methacrylic acid | 142.2 | 4.74 |
| 2-methoxyethyl acrylate | 213.6 | 7.12 |
| Xylene | 142.2 | 4.74 |
| Methyl Styrene Dimer | 14.1 | 0.47 |

-continued

| Description | Quantity (g) | Weight (%) |
|---|---|---|
| AIBN | 35.4 | 1.18 |
| AMBN | 99.3 | 3.31 |
| add chaser and xylene over 1/2 hour | | |
| t-butylperoxy 2-ethylhexyl carbonate | 7.2 | 0.24 |
| Xylene | 142.2 | 4.74 |
| mix for 90 minutes after chaser is in. Cool down and add | | |
| Xylene | 113.7 | 3.79 |
| Total | 3000 | 100 |
| Manual Yield % | 100 | |
| Net | 3000 | |

Example 1C: Synthesis of a Binder Component Using the Acrylate Polymer "Ac(AV=100-)" to Give a Zinc Acrylate Polymer Referred to Herein as "Zn—Ac (AV=100-)"

| Description | Quantity (g) | Weight (%) |
|---|---|---|
| Ac (AV = 100-) | 3000 | 82.395 |
| Zinc Oxide | 81 | 2.225 |
| zinc naphthenate | 560 | 15.38 |
| Mix for 6 hours at 100° C. and add 20 g water if ZnO is not dissolved after 6 hours | | |
| Total | 3641 | 100 |
| Manual Yield % | 100 | |
| Net | 3641 | |

Example 1D: Synthesis of a Binder Component Using the Acrylate Polymer "Ac (AV=100)" to Give a Zinc Acrylate Polymer Referred to Herein as "Zn—Ac (AV=100)"

| Description | Quantity (g) | Weight (%) |
|---|---|---|
| Ac (AV = 100) | 3000 | 75.82 |
| Zinc Oxide | 106.5 | 2.69 |
| zinc naphthenate | 850 | 21.48 |
| Mix for 6 hours at 100° C. and add 20 g water if ZnO is not dissolved after 6 hours | | |
| Total | 3956.5 | 100 |
| Manual Yield % | 100 | |
| Net | 3956.5 | |

Example 1E: Synthesis of a Silyl Acrylate Polymer Standard TIPX Binder Component Referred to Herein as "Si—Ac"

| Description | Quantity (g) | Weight (%) |
|---|---|---|
| Xylene | 1826 | 45.65 |
| add the following monomer mixture dropwise over 3 hours at 90° C. | | |
| methyl methacrylate | 665.4 | 16.64 |
| butyl acrylate monomer | 228 | 5.7 |
| 2-methoxyethyl acrylate | 99.2 | 2.48 |
| trisopropysilyl acrylate monomer (TIPX) | 992.4 | 24.81 |
| AIBN | 20 | 0.5 |

-continued

| Description | Quantity (g) | Weight (%) |
|---|---|---|
| after all monomer added, mix for additional 2 hours at 90° C., then add | | |
| t-butylperoxy 2-ethylhexyl carbonate | 10 | 0.25 |
| Xylene | 159 | 3.98 |
| drop xylene mixture over 1/2 hour at 90° C., then mix another 1 hour before cooling down | | |
| Total | 4000 | 100 |
| Manual Yield % | 100 | |
| Net | 4000 | |

Example 1F: Synthesis of Silyl Acrylate Polymer Lower TIPX Binder Component Referred to Herein as "Si—Ac (TIPX-L)"

| Description | Quantity (g) | Weight (%) |
|---|---|---|
| Xylene | 1826 | 45.65 |
| add the following monomer mixture dropwise over 3 hours at 90° C. | | |
| methyl methacrylate | 912 | 22.8 |
| butyl acrylate monomer | 310 | 7.75 |
| 2-methoxyethyl acrylate | 60 | 1.5 |
| trisopropylsilyl acrylate monomer | 703 | 17.58 |
| AIBN | 20 | 0.5 |
| after all monomer added, mix for additional 2 hours at 90° C., then add | | |
| t-butylperoxy 2-ethylhexyl carbonate | 10 | 0.25 |
| Xylene | 159 | 3.98 |
| Total | 4000 | 100 |

-continued

| Description | Quantity (g) | Weight (%) |
|---|---|---|
| Manual Yield % | 100 | |
| Net | 4000 | |

Example 2: Comparison of Potency of $Cu_2O$ and $Cu(ETFAA)_2$ in Antifouling Paints In order to confirm that the amount of $Cu_2O$ can be significantly reduced and even avoided if $Cu(ETFAA)_2$ is present in antifouling paints, the efficacy of a set of self-polishing antifouling paints was evaluated by immersing experimental painted panels in seawater on a test raft. Two self-polishing antifouling paints containing a silyl acrylate polymer as binder component and either $Cu(ETFAA)_2$ and CuPT ("experimental paint") or $Cu_2O$ and CuPT ("control paint") have been prepared for this purpose (cf., Table 1). The synthesis of the silyl acrylate polymer component used in these paints is provided in Example 1E above.

TABLE 1

Composition of the experimental paint and control paint:

| Paint | Experimental | | Control | |
|---|---|---|---|---|
| Ingredient | % wt | Volume (ml) | % wt | Volume (ml) |
| Si-Ac 50% in xylene | 25.0 | 25.25 | 25.0 | 25.25 |
| Gum Rosin 50% in xylene | 5.0 | 5.15 | 5.0 | 5.15 |
| Tricresyl phosphate | 2.0 | 1.72 | 2.0 | 1.72 |
| $Fe_2O_3$ | 3.0 | 0.52 | 3.0 | 0.52 |
| Talc | 2.5 | 0.91 | 0.0 | 0 |
| ZnO | 5.0 | 0.89 | 5.0 | 0.89 |
| Bentonite clay | 1.0 | 0.59 | 1.0 | 0.59 |
| A630-20X polyamide wax | 2.5 | 2.75 | 2.5 | 2.75 |
| PGM | 2.0 | 2.17 | 2.0 | 2.17 |
| Ethyl Silicate | 0.5 | 0.53 | 0.5 | 0.53 |
| Xylene | 10.0 | 11.61 | 10.0 | 11.61 |
| $Cu_2O$ | 0 | 0 | 40.0 | 6.78 |
| CuPT | 4.0 | 2.20 | 4.0 | 2.20 |
| $Cu(ETFAA)_2$ | 8.2 | 4.50 | 0 | 0 |
| Total | 70.7 | 58.79 | 100.0 | 60.41 |

Because cuprous oxide is about 3 times more dense than $Cu(ETFAA)_2$, the addition of 2.5 g of talc was used to bring the volume of talc and $Cu(ETFAA)_2$ to about the volume of cuprous oxide in the paint. Adding more talc to fully make up for the volume of cuprous oxide would affect the amount of free binder since talc has a higher binder demand (surface area/gram) than cuprous oxide.

Figure 1:
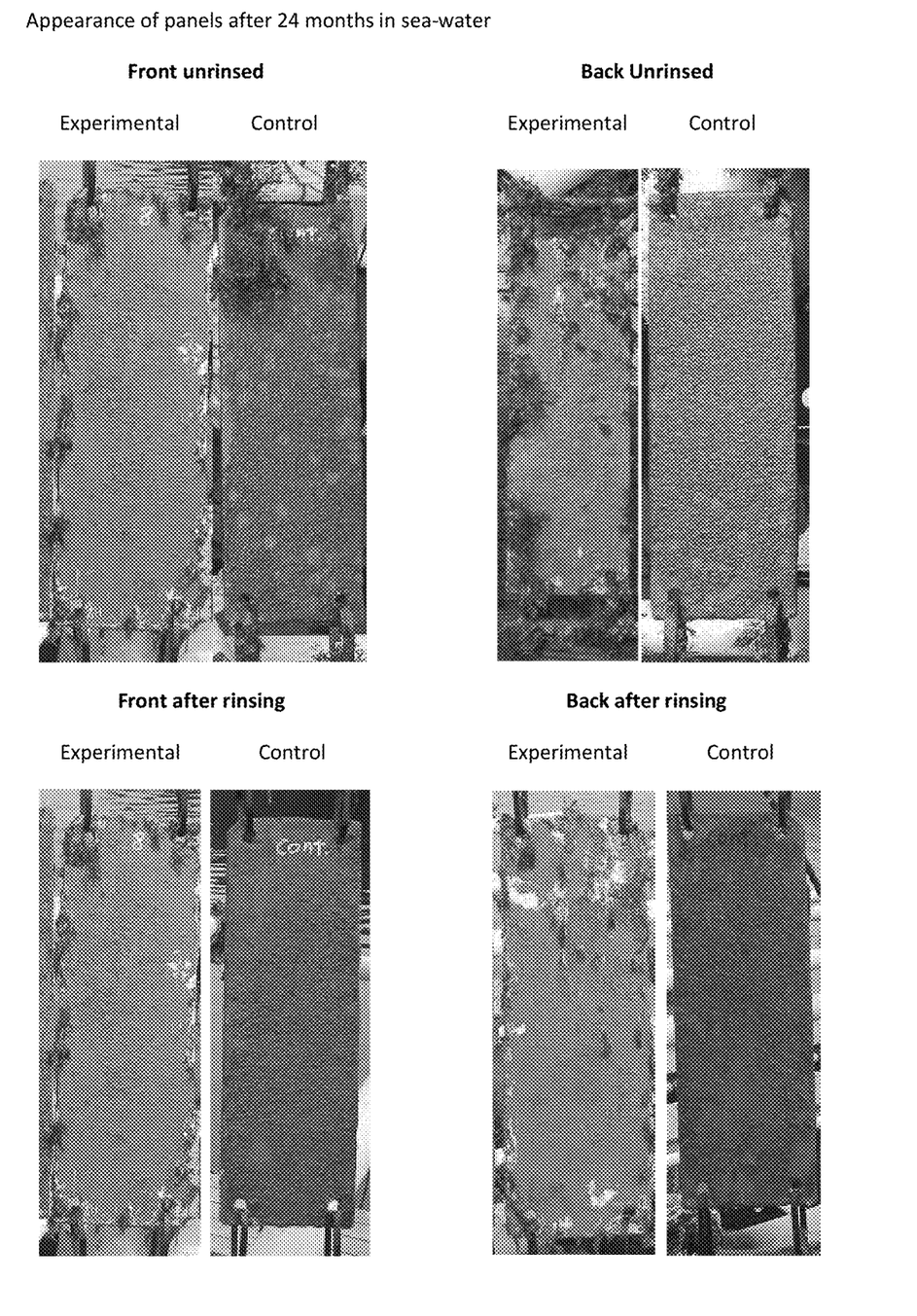
FIG. 1 depicts panels coated with the antifouling paints of example 2, Table 1, and shows the appearance of the panels after 24 months in sea-water in the un-rinsed state and after rinsing.

Results: The results after 24 months immersion in sea water from September 2015 until September 2017 are shown in FIG. 1, which shows pictures of the panels in the un-rinsed state and after rinsing. The rinsing of the panels with a low pressure stream of water simulates the slow movement of a boat. The movement of a boat will loosen and remove any of the loosely attached fouling. The "experimental paint" containing $Cu(ETFAA)_2$ and copper pyrithione effectively inhibited the growth of marine organisms, and was more potent in this regard than the control paint containing 40 wt % cuprous oxide and copper pyrithione. The experimental paint eroded slightly faster than the control paint. This was expected due to the known property of cuprous oxide of lowering the rate of erosion of the silyl acrylate polymer.

Example 3: Preparation of Antifouling Paints

Three sets of antifouling paints were prepared based on binder technologies used for different types of marine antifouling paints. Exemplary paints were prepared that included either self-polishing binder types, i.e., based on zinc acrylate polymers and silyl acrylate polymers in two different amounts of the functional monomer (zinc acrylate monomer or silyl acrylate monomer), or an ablative binder type based on rosin and a non-eroding VAGH polymer. Since the volumes of the materials for making the paints affect the properties of the paint, such as dry film thickness and amount of antifouling agent in the dry film, the volume solids of the materials in the formulations were kept essentially constant in each class of coating except where they were purposely varied to observe the effects of the material on the antifouling performance.

Self-Polishing Antifouling Paints Based on a "Zinc Acrylate Polymer-Based Binder"

Experimental Paint Nos 4, 11, 12 and control paint 69, all using the zinc acrylate polymer referred to herein as "Zn—Ac (AV=100)" according to example 1D as a binder component

| Experimental Paint | 4 | 11 | 12 | 69 |
|---|---|---|---|---|
| | % Weight | | | |
| Zn-Ac (AV = 100) | 28.51 | 23.73 | 20.79 | 17.51 |
| Gum Rosin/Xylene 1:1 | — | 6.4 | 9.71 | 8.00 |
| Xylene | 4.24 | 3.78 | 3.48 | 2.50 |
| TiO2 R902+ | 15.59 | 25.94 | 25.94 | — |
| $Cu_2O$ | — | 2.70 | 2.70 | 41.27 |
| Zinc Oxide | 15.59 | — | — | 5.00 |
| Bentone SD 2 | 0.39 | 0.40 | 0.40 | 0.38 |
| red iron oxide | 1.56 | 1.62 | 1.62 | 1.50 |
| CuPT | 3.95 | 4.05 | 4.05 | 3.33 |
| $Cu(ETFAA)_2$ | 8.34 | 8.66 | 8.66 | — |
| Zn-Ac (AV = 100) | 16.63 | 17.26 | 17.26 | 16.01 |
| Xylene | 5.20 | 5.39 | 5.39 | 4.50 |
| Total | 100.00 | 100.0 | 100.00 | 100.00 |

Experimental Paint Nos 22, 25, 20, 23 and 26 all using the zinc acrylate polymer referred to herein as "Zn—Ac (AV=100–)" according to example 1C as a binder component

| Experimental Paint | 22 | 25 | 20 | 23 | 26 |
|---|---|---|---|---|---|
| | % Weight | | | | |
| Zn-Ac (AV = 100–) | 29.35 | 29.17 | 23.02 | 23.53 | 23.32 |
| Gum Rosin/Xylene 1:1 | — | — | 6.37 | 6.51 | 6.46 |
| Xylene | 4.43 | 4.40 | 3.72 | 3.80 | 3.77 |
| TiO2 R902+ | 26.14 | 23.77 | 19.73 | 26.11 | 24.07 |
| Zinc Oxide | — | — | 10.62 | — | — |
| Bentone SD 2 | 0.41 | 0.41 | 0.40 | 0.41 | 0.40 |
| red iron oxide | 1.63 | 1.62 | 1.59 | 1.63 | 1.61 |
| CuPT | 4.08 | 4.08 | 3.98 | 4.07 | 4.03 |
| $Cu(ETFAA)_2$ | 8.70 | 8.73 | 8.52 | 8.71 | 8.63 |
| $Cu_2O$ | 2.72 | 2.70 | 5.4 | 2.71 | 5.38 |
| Zn-Ac (AV = 100–) | 17.12 | 17.02 | 16.73 | 17.10 | 16.94 |
| Xylene | 5.43 | 5.40 | 5.31 | 5.43 | 5.38 |
| Total | 100.00 | 100.00 | 100.00 | 100.00 | 100.00 |

Ablative Antifouling Paints

Experimental Paint Nos 32, 36, 37, 108A, 108B and 108C as well as control paint 70, all using a commercial VAGH polymer as a binder component

| | Paint | | | | | |
|---|---|---|---|---|---|---|
| | 32 | 36 | 37 | 70 | 101 | 104 |
| | | | % Weight | | | |
| VAGH (22%) in 2:3 xylene:MIBK | 11.32 | 31.58 | 19.07 | 15.69 | 16.80 | 16.80 |
| Gum Rosin/Xylene 1:1 | 32.3 | 19.12 | 25.68 | 17.17 | 17.78 | 17.78 |
| Tricresyl Phosphate | 3.66 | 3.19 | 4.28 | 2.70 | 3.17 | 3.17 |
| Disperbyk 161 | 1.83 | 1.59 | 2.14 | 1.35 | 1.30 | 1.30 |
| Minex 4 | — | — | — | 8.58 | 8.24 | 8.24 |
| Bentone SD 2 | 0.57 | 0.49 | 0.66 | 0.42 | 3.94 | 3.94 |
| Zinc Oxide | 9.32 | — | — | 4.90 | 22.19 | 22.19 |
| $Cu_2O$ | — | 8.55 | 5.06 | 36.78 | — | — |
| CuPT | 3.50 | 3.01 | 3.27 | 2.70 | — | — |
| DCOIT | — | — | — | — | — | 16.03 |
| TiO2 R902+ | 15.98 | 13.90 | 19.46 | — | — | — |
| red iron oxide | 2.20 | 1.91 | 2.57 | 1.62 | — | — |
| $Cu(ETFAA)_2$ | 7.49 | 6.37 | 6.93 | — | 16.03 | — |
| Gum Rosin/Xylene 1:1 | 9.16 | 7.97 | 7.78 | 3.68 | — | — |

-continued

| | Paint | | | | | |
|---|---|---|---|---|---|---|
| | 32 | 36 | 37 | 70 | 101 | 104 |
| | | | % Weight | | | |
| Disparlon 6900-20x | 2.66 | 2.32 | 3.11 | 1.96 | 1.99 | 1.99 |
| Xylene | — | — | — | 2.45 | 8.56 | 8.56 |
| Total | 100.00 | 100.00 | 100.00 | 100.00 | 100.00 | 100.00 |

Experimental paint 108A: 1:1 mixture of experimental paints 101 and 104

Experimental paint 1081B: 5:3 mixture of experimental paints 101 and 104

Experimental paint 108C: 3:5 mixture of experimental paints 101 and 104

Self-Polishing Antifouling Paints Based on a "Silyl Acrylate" Polymer-Based Binder Experimental Paint Nos 53, 60, 61, 63, 64, 66, 67 and 111 all using the silyl acrylate polymers referred to as "Si—Ac" or "Si—Ac (TIPX-L)" according to examples 1E and 1F as binder components

| | Experimental paint | | | | | | | |
|---|---|---|---|---|---|---|---|---|
| | 53 | 60 | 61 | 63 | 64 | 66 | 67 | 111 |
| | | | | % Weight | | | | |
| Si—Ac | 48.88 | — | — | — | — | — | — | — |
| Si—Ac (TIPX-L) | — | 35.35 | 28.60 | 35.35 | 28.60 | 35.35 | 28.60 | 42.16 |
| Gum Rosin/Xylene 1:1 | — | 14.15 | 21.25 | 14.15 | 21.25 | 14.15 | 21.25 | 2.61 |
| Tricresyl Phosphate | 2.83 | 2.83 | 2.83 | 2.83 | 2.83 | 2.80 | 2.75 | 3.14 |
| CuPT | 5.65 | 5.65 | 5.58 | 5.65 | 5.55 | 5.50 | 5.45 | — |
| Cu(ETFAA)$_2$ | 11.58 | 11.5 | 11.4 | 11.5 | 11.35 | 11.25 | 11.13 | 16.03 |
| red iron oxide | 4.00 | 4.25 | 4.25 | 4.25 | 4.25 | 4.25 | 4.25 | — |
| Cu$_2$O | 11.48 | — | — | 7.5 | 7.5 | 11.25 | 11.0 | — |
| Minex 4 | — | 3.53 | 3.55 | 3.25 | 3.20 | 0.25 | 0.60 | 3.48 |
| Zinc Oxide | — | 7.08 | 7.08 | — | — | — | — | 7.84 |
| Xylene | — | — | — | — | — | — | — | 9.71 |
| Bentone SD 2 | 1.38 | 1.43 | 1.43 | 3.53 | 3.53 | 1.40 | 1.43 | 1.57 |
| Disparlon 6900-20x | 3.53 | 3.53 | 3.53 | 2.83 | 2.83 | 3.53 | 3.53 | 3.83 |
| MPM | 2.75 | 2.83 | 2.83 | 0.70 | 0.70 | 2.83 | 2.83 | — |
| tetra ethyl ortho silicate | 0.70 | 0.70 | 0.70 | 7.05 | 7.00 | 0.70 | 0.70 | — |
| Xylene | 7.25 | 7.20 | 7.00 | 1.43 | 1.43 | 6.75 | 6.50 | 9.62 |
| Total | 100.00 | 100.00 | 100.00 | 100.00 | 100.00 | 100.00 | 100.00 | 100.00 |

Each class of antifouling paint (i.e., based on the different binder types) may display some variations in the ratios of the specific materials used due to differences in how the materials interact and affect properties such as applicability and viscosity. The skilled artisan will understand that it is sometimes necessary to not have equivalent properties between the different classes of coatings such as volume solids because of the effects of the materials on application and viscosity of the coating. Variability in the compositions is also allowed (and warranted) to account for anticipated leach rates of the antifouling agents. For example, the antifouling agents will leach out from paints based on silyl acrylate based binders at a slower rate than from paints based on ablative binders or zinc acrylate based binders. Therefore, higher amounts of antifouling agents are used in paints based on silyl acrylate based binders because static raft testing requires a relatively high leach rate of antifouling agent to prevent fouling.

Example 5: Antifouling Experiment

The antifouling paints of Example 4 above were evaluated with regard to antifouling properties. Fiberglass (FRP) panels have been coated with these paints. Because the dry film thickness will have an effect on the antifouling performance, this has been carefully controlled by weighing the FRP panels after each coat of paint has dried and adjusting the weight of applied paint for the density of the dry paint to give a target dry film thickness of 150 μm. All the painted panels are within 10 μm of 150 μm dry film thickness.

The test panel dimensions were 457 mm×102 mm×3.33 mm. Therefore the volume of dry coating for the front of the panel required for 150 μm dry film thickness is 6.992 ml. The volume required for the back side and the edges is 6.992+0.533=7.525 ml. The volume of paint applied was not measured, but calculated by the density of the dry paint and the weight of the dry paint applied.
a) Weight of dry paint applied to front of panel=6.992 ml×density of paint solids (g/ml)
b) Weight of dry paint applied to back and edges of panel=7.525 ml×density of paint solids The test panels were exposed to sea-water. The results after 2, 4, 6 and 8 months of immersion are shown in the following Table 2. All of the antifouling paints according to the invention exhibited excellent antifouling properties.

TABLE 2

Antifouling properties of antifouling paints

| | | Binder components | | Biocidal agents | | Antifouling property against marine organisms | | | | | | | |
| | | | Rosin 1:1 | | | Animal | | | | Algae | | | |
| | No | Polymer | IN XYLENE % wt | Cu(ETFAA)$_2$ % wt | Cu$_2$O % wt | CuPT % wt | 2 m Aut | 4 m Winter | 6 m | 8 m Spr | 2 m Aut | 4 m Winter | 6 m | 8 m Spr |
| --- | --- | --- | --- | --- | --- | --- | --- | --- | --- | --- | --- | --- | --- | --- |
| SPC | 4 | Zn—Ac (AV = 100) | — | 8.34 | — | 3.95 | 4 | 4 | 4 | 4 | 4 | 4 | 3 | 3 |
| SPC-Hybrid | 11 | Zn—Ac (AV = 100) | 6.47 | 8.66 | 2.7 | 4.05 | 4 | 4 | 4 | 4 | 4 | 3 | 3 | 3 |
| SPC-Hybrid | 12 | Zn—Ac (AV = 100) | 9.71 | 8.66 | 2.7 | 4.05 | 4 | 4 | 4 | 4 | 4 | 3 | 3 | 3 |
| control | 69 | Zn—Ac (AV = 100) | 8.00 | — | 41.27 | 3.33 | 4 | 4 | 4 | 4 | 4 | 3 | 2 | 2 |
| SPC | 22 | Zn—Ac (AV = 100-) | — | 8.70 | 2.72 | 4.08 | 4 | 4 | 4 | 4 | 4 | 4 | 4 | 4 |
| SPC | 25 | Zn—Ac (AV = 100-) | — | 8.73 | 5.4 | 4.08 | 4 | 4 | 4 | 4 | 4 | 4 | 4 | 4 |
| SPC-Hybrid | 20 | Zn—Ac (AV = 100-) | 6.37 | 8.52 | — | 3.98 | 4 | 4 | 4 | 4 | 4 | 4 | 3 | 4 |
| SPC-Hybrid | 23 | Zn—Ac (AV = 100-) | 6.51 | 8.71 | 2.71 | 4.07 | 4 | 4 | 4 | 4 | 4 | 4 | 4 | 4 |
| SPC-Hybrid | 26 | Zn—Ac (AV = 100-) | 6.46 | 8.63 | 5.38 | 4.03 | 4 | 4 | 4 | 4 | 4 | 4 | 4 | 4 |
| Ablative | 32 | VAGH | 32.3 | 7.49 | — | 3.50 | 4 | 4 | 4 | 4 | 4 | 4 | 4 | 3 |
| Ablative | 36 | VAGH | 19.12 | 6.37 | 8.55 | 3.01 | 4 | 4 | 4 | 4 | 4 | 4 | 4 | 4 |
| Ablative | 37 | VAGH | 25.68 | 6.93 | 5.06 | 3.27 | 4 | 4 | 4 | 4 | 4 | 4 | 4 | 4 |
| Control | 70 | VAGH | 17.17 | — | 36.78 | 2.70 | 4 | 4 | 4 | 4 | 4 | 4 | 4 | 4 |
| SPC | 53 | Si—Ac | — | 11.58 | 11.48 | 5.65 | 4 | 4 | 4 | 4 | 4 | 4 | 4 | 4 |
| SPC-Hybrid | 60 | Si—Ac (TIPX-L) | 14.15 | 11.5 | — | 5.65 | 4 | 4 | 4 | 4 | 4 | 4 | 4 | 4 |
| SPC-Hybrid | 61 | Si—Ac (TIPX-L) | 21.25 | 11.4 | — | 5.58 | 4 | 4 | 4 | 4 | 4 | 4 | 4 | 4 |
| SPC-Hybrid | 63 | Si—Ac (TIPX-L) | 14.15 | 11.5 | 7.5 | 5.65 | 4 | 4 | 4 | 4 | 4 | 3 | 2 | 2 |
| SPC-Hybrid | 64 | Si—Ac (TIPX-L) | 21.25 | 11.35 | 7.5 | 5.55 | 4 | 4 | 4 | 4 | 4 | 3 | 2 | 2 |
| SPC-Hybrid | 66 | Si—Ac (TIPX-L) | 14.15 | 11.25 | 11.25 | 5.50 | 4 | 4 | 4 | 4 | 4 | 3 | 2 | 2 |
| SPC-Hybrid | 67 | Si—Ac (TIPX-L) | 21.25 | 11.13 | 11.0 | 5.45 | 4 | 4 | 4 | 4 | 4 | 3 | 2 | 2 |

| | | Binder components | | Biocidal agents | Antifouling property against marine organisms | | | | | | | |
| | | | | | Animal | | | | Algae | | | |
| | No | Polymer | Rosin % wt | Cu(ETFAA)$_2$ % wt | DCOIT % wt | 2 m Aut | 4 m Winter | 6 m | 8 m Spr | 2 m Aut | 4 m Winter | 6 m | 8 m Spr |
| --- | --- | --- | --- | --- | --- | --- | --- | --- | --- | --- | --- | --- | --- |
| Ablative | 108A | VAGH | 17.78 | 8 | 8 | 4 | 4 | 4 | 4 | 4 | 4 | 4 | 4 |
| Ablative | 108B | VAGH | 17.78 | 10 | 6 | 4 | 4 | 4 | 4 | 4 | 4 | 4 | 4 |
| Ablative | 108C | VAGH | 17.78 | 6 | 10 | 4 | 4 | 4 | 4 | 4 | 4 | 4 | 4 |
| SPC | 111 | Si—Ac (TIPX-L) | 2.61 | 16.03 | — | 4 | 4 | 4 | 4 | 4 | 4 | 3 | $3^5$ |

Details of the categories applied for the results are explained in the following.

Antifouling properties with regard to Algae: Antifouling properties with regard to animals such as barnacles, bryozoans, hydroids, mussels and the like
Excellent (4): No algae.
Good (3): It is thin and covered with slime. Excellent (4): No animal.
Fair (2): It is thick and covered with slime. Good (3): It is covered with small and very few animals.
Poor (1): It is thick and covered with slime and/or few algae. Fair (2): It is covered with small and few animals.
Bad (0): It is thick and covered with slime and/or many algae. Poor (1): It is covered with small/large and few animals.
Bad (0): It is covered with small/large and many animals.

The invention claimed is:

1. An antifouling composition comprising copper di(ethyl 4,4,4-trifluoroacetoacetate) and one or more biocidal agents selected from the group consisting of copper 2-pyridinethiol-1-oxide (copper pyrithione, CuPT), zinc 2-pyridinethiol-1-oxide (zinc pyrithione, ZnPT), 4,5-dichloro-2-n-octyl-4-isothiazolin-3-one (DCOIT), cuprous oxide ($Cu_2O$), zinc oxide (ZnO), 4-bromo-2-(4-chlorophenyl)-5-(trifluoromethyl)-1H-pyrrole-3-carbonitrile (tralopyril), zinc ethane-1,2-diylbis(dithiocarbamate) (zineb), zinc N,N-dimethylcarbamodithioate (ziram), 3-(3,4-dichlorophenyl)-1,1-dimethylurea (diuron), copper(I) thiocyanate (CuSCN), 4-[1-(2,3-dimethylphenyl)ethyl]-1H-imidazole (medetomidine), triazines, fluanids and 2,4,5,6-tetrachloroisophthalonitrile (chlorothalonil).

2. The antifouling composition of claim 1, wherein the one or more biocidal agent is selected from the group consisting of CuPT, ZnPT, DCOIT, $Cu_2O$, and tralopyril.

3. The antifouling composition of claim 1, wherein the one or more biocidal agent is selected from the group consisting of CuPT and $Cu_2O$.

4. The antifouling composition of claim 1, wherein the biocidal agent is CuPT.

5. The antifouling composition of claim 1, wherein the biocidal agent is $Cu_2O$.

6. The antifouling composition of claim 3, wherein the biocidal agents are CuPT and $Cu_2O$.

7. The antifouling composition of claim 3, wherein the ratio of $Cu(ETFAA)_2$ (wt %) to CuPT (wt %) and/or the ratio of $Cu(ETFAA)_2$ (wt %) to $Cu_2O$ (wt %) is from 100:1 to 1:100.

8. A method for inhibiting marine biofouling on a solid surface, comprising:
applying an antifouling composition on the solid surface, wherein said antifouling composition comprises copper di(ethyl 4,4,4-trifluoroacetoacetate).

9. The method of claim 8, wherein the antifouling composition further comprises one or more biocidal agents.

10. The method of claim 9, wherein the one or more biocidal agents is selected from the group consisting of copper 2-pyridinethiol-1-oxide (copper pyrithione, CuPT), zinc 2-pyridinethiol-1-oxide (zinc pyrithione, ZnPT), 4,5-dichloro-2-n-octyl-4-isothiazolin-3-one (DCOIT), cuprous oxide ($Cu_2O$), zinc oxide (ZnO), 4-bromo-2-(4-chlorophenyl)-5-(trifluoromethyl)-1H-pyrrole-3-carbonitrile (tralopyril), zinc ethane-1,2-diylbis(dithiocarbamate) (zineb), zinc N,N-dimethylcarbamodithioate (ziram), 3-(3,4-dichlorophenyl)-1,1-dimethylurea (diuron), copper(I) thiocyanate (CuSCN), 4-[1-(2,3-dimethylphenyl)ethyl]-1H-imidazole (medetomidine), triazines, fluanids and 2,4,5,6-tetrachloroisophthalonitrile (chlorothalonil).

11. The method of claim 8, wherein the antifouling composition is used in combination with a polymer and/or copolymer allowing controlled release of copper di(ethyl 4,4,4-trifluoroacetoacetate).

12. An antifouling paint comprising the antifouling composition of claim 1 and a polymer and/or copolymer allowing controlled release of $Cu(ETFAA)_2$.

13. The antifouling paint of claim 12, wherein the content of $Cu(ETFAA)_2$ is from about 1 to about 25 wt %.

14. The antifouling paint of claim 12, wherein the total content of said one or more biocidal agent is less than about 30 wt %.

15. The antifouling paint of claim 12, wherein the total content of CuPT is less than about 10 wt %, and/or the total content of $Cu_2O$ is less than about 20 wt %.

16. A method for inhibiting marine biofouling on a solid surface, comprising applying an antifouling paint of claim 12 onto the surface.

* * * * *